UNITED STATES PATENT OFFICE.

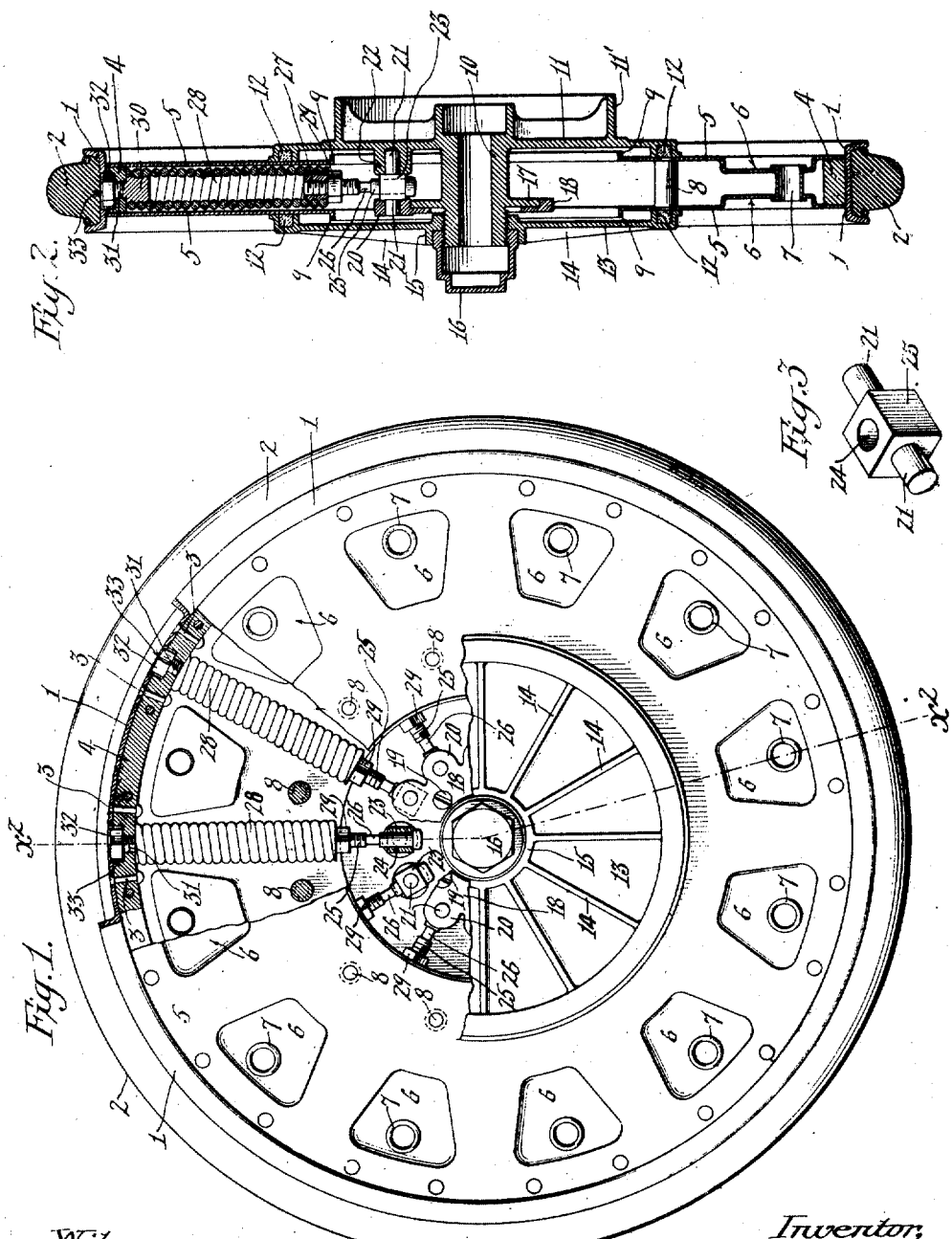

HARRISON E. STROUD, OF LOS ANGELES, CALIFORNIA.

SPRING-WHEEL.

1,000,640.  Specification of Letters Patent.  Patented Aug. 15, 1911.

Application filed May 3, 1909. Serial No. 493,745.

*To all whom it may concern:*

Be it known that I, HARRISON E. STROUD, a citizen of the United States, residing at Los Angeles, in the county of Los Angeles and State of California, have invented a new and useful Spring-Wheel, of which the following is a specification.

This invention relates to spring wheels of a type wherein the hub of the wheel is resiliently supported with respect to the rim, so that shocks are not transmitted from the rim to the hub. The means for resiliently supporting the hub consists of a series of radial coil springs which extend between the rim and hub, and one object of this invention is to so connect the inner ends of the springs that the springs are free to assume a tangential position relative to the hub due to the partial rotation of the latter within the wheel, and also to the eccentric movement of the hub under the load, this connection consisting of pivot pins in which tension bolts are free to slide, the tension bolts being connected to the springs so that should the movement of the hub exceed the initial extension of any spring, the tension bolts may slide in the pivot pins and thereby prevent such springs from buckling under the compression load which they are not adapted to sustain as the springs act under tension only.

The invention also includes a pair of webbed disks arranged intermediate of the hub and felly, and a further object is to form such plates with recesses stamped therein to stiffen the plates and enable a relatively thin plate to be used, thus reducing the weight of the wheel and also improving the appearance by giving the effect of spokes.

The invention also includes a side flange, and a further object is to enable the adjustment of the same.

Another object is to provide for securing a tire chain to the wheel.

A further object is to provide packing between the side flanges and the webbed disks to exclude dust and water, one of the side plates being adjustable to secure an exact adjustment between the faces of the two side flanges for the disks to work freely yet without lost motion or rattle.

Another object is to provide a novel fastening for the outer ends of the springs.

Further objects and advantages of the invention relate to details of the construction as will appear in the following description.

The accompanying drawings illustrate the invention and referring thereto: Figure 1 is a side elevation of the wheel with part of a disk broken away and part of a side plate broken away. Fig. 2 is a section on line $x^2-x^2$ in Fig. 1. Fig. 3 is a perspective of a pivot pin.

The rim 1 receives the tire 2 which may be of any preferred construction or which may be omitted if desired. Secured to the rim 1 by rivets 3 is an inner ring 4 which strengthens the rim 1 and also enables the attachment of springs to be described.

Attached to each side of the inner ring 4 are disks 5 which are stamped to form recesses 6 to stiffen the plates, and at the same time present the appearance of spokes. This method of stiffening the plates enables a thinner material to be employed than otherwise. An eyelet 7 passes through each pair of recesses 6 and affords means for the attachment of a tire chain not shown. The eyelets enable the chain to be passed therethrough and wound around the rim of the wheels, the eyelet forming a guide of small diameter to positively hold the chain in precise position and prevent it from slipping in either direction. Shouldered bolts 8 are arranged between the disks 5 near their inner rims and act to space the disks apart. The bolts 8 are riveted in place. The inner edges of the disks 5 have flanges 9 which limit eccentric movement of the hub with respect to the rim.

10 designates the hub, at one end of which a side plate 11 is arranged, being preferably cast thereon together with brake drum 11'. The side plate 11 is annularly grooved to receive a packing ring 12 which bears against the face of the adjacent disk 5. Another side plate 13 is screwed on the other end of the hub and is provided with a similar packing ring 12. The side plate 13 is formed with radial webs 14 to stiffen it, and has a flange 15. The side plate 13 is thus adjustable on the hub 10 toward and from the opposite side plate 11 so that the pressure of the packing rings 12 against the disks 5 may be regulated to permit free movement of the side plates with respect to the disks and yet prevent the entrance of mud and water.

16 is a cap screwed on the end of hub 10 and acting also as a lock nut to prevent accidental turning of the side plate 13. In order to adjust the side plate 13, cap 16 is first loosened and after the side plate 13 has been adjusted the cap 16 is screwed tight again.

The hub 10 has a flange 17 to which a pivot collar 18 is attached by screws 19. The pivot collar 18 is formed with bearings 20 to receive pivot pins 21, and an opposite side plate 11 is also formed with bearings 22 to receive the other ends of the pivot pins 21. Each pivot pin 21 has a squared center portion 23 with a diametrical hole 24 which receives the round shank of a tension bolt 25. Each tension bolt 25 has a squared portion 26 to enable it to be turned by a wrench and a threaded portion of each tension bolt is screwed into an internally threaded nut 27, as shown in Fig. 2, each nut 27 being also externally threaded with coarse threads and screwed into its tension spring 28. A lock nut 29 is provided on each tension bolt for preventing the tension bolt from rotating accidentally. By loosening the nut 29 the tension bolt may be adjusted in the nut 27 to adjust the tension of the spring 28, and the tension bolt 25 is slidable in the hole 24 of the pivot pin 21 so that the spring 28 does not receive any compression at any time.

A head 30 is screwed in the outer end of each spring 28 and has a threaded stud 31 which passes through the inner ring 4 and is secured by a nut 32 which is received within a recess 33 formed in the rim 1 and ring 4.

By this construction it will be seen that the inner ends of the springs being pivotally and slidably secured permit the necessary freedom of movement required by the partial rotation and eccentric movement of the hub in the operation of the wheel. The springs are sufficiently flexible to allow of the movement between the separating bolts 8. Ordinarily the partial rotation of the hub will not deflect the springs sufficiently to bring them into contact with the spacing bolts 8 but should they come in contact with the spacing bolts the flexibility of the springs prevents any possible damage.

What I claim is:—

1. In a spring wheel, a rim, a hub, disks attached to said rim, said disks being formed with depressions to stiffen them, side plates carried by the hub and slidably fitting said disks, and springs extending between the rim and hub intermediate said depressions.

2. In a spring wheel, a rim, a hub, a side plate on one end of said hub, a collar secured to said hub, pivot pins carried by said side plate and collar, a side plate screwed on the other end of said hub, disks extending inwardly from said rim between the side plates, and tension springs immovably secured to the rim and connected with the pivot pins.

3. In a spring wheel, a rim, a hub, a side plate formed at one end of the hub, a flange on said hub, a side plate screwed on said hub, outside said flange, disks extending from the rim between said side plates, a pivot collar detachably secured to said flange, pivot pins pivoted at one end in said pivot collar and at their other ends in the first named side plate, tension bolts slidable laterally in said pivot pins, springs secured to said tension bolts, the outer ends of said springs being secured to said rim.

4. In a spring wheel, a rim, a hub, disks secured to the rim and extending toward the hub, the inner edges of said disks having outwardly directed flanges, a side plate on one end of said hub, the outer edge of said plate having two flanges forming a circular groove, a packing ring in said groove bearing against the adjacent disk, a series of bosses on said side plate, a flange on said hub, a collar fitting over said flange, pivot blocks between said bosses and said collar, pins on said pivot blocks extending from opposite ends of said pivot blocks and journaled respectively in said collar and bosses, a side plate adjustably secured to the other end of said hub and with a packing ring bearing against the adjacent side plate, and springs extending between said pivot blocks and rim.

In testimony whereof, I have hereunto set my hand at Los Angeles, California, this 27th day of April 1909.

HARRISON E. STROUD.

In presence of—
G. T. HACKLEY,
FRANK L. A. GRAHAM.